Patented Dec. 5, 1950

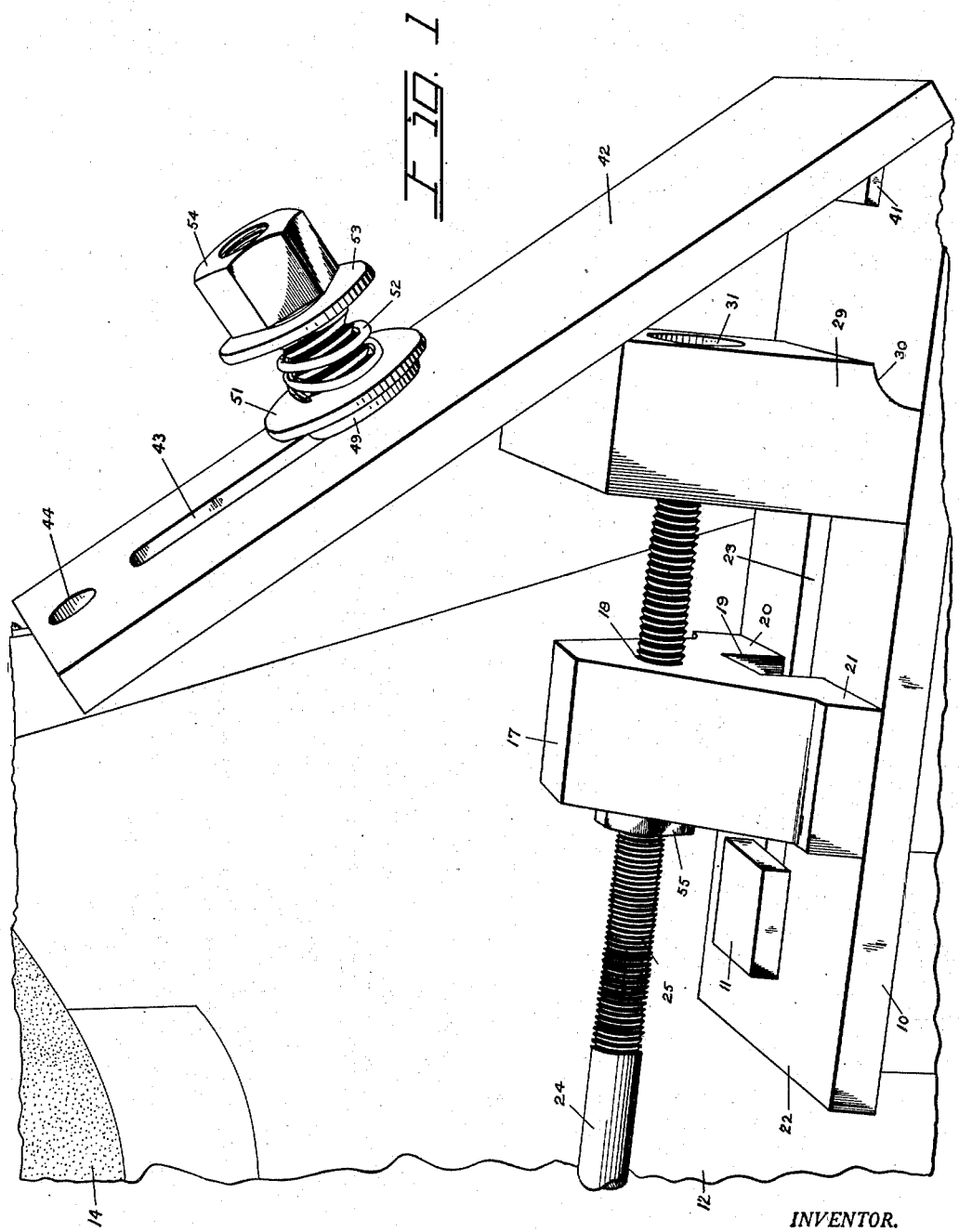

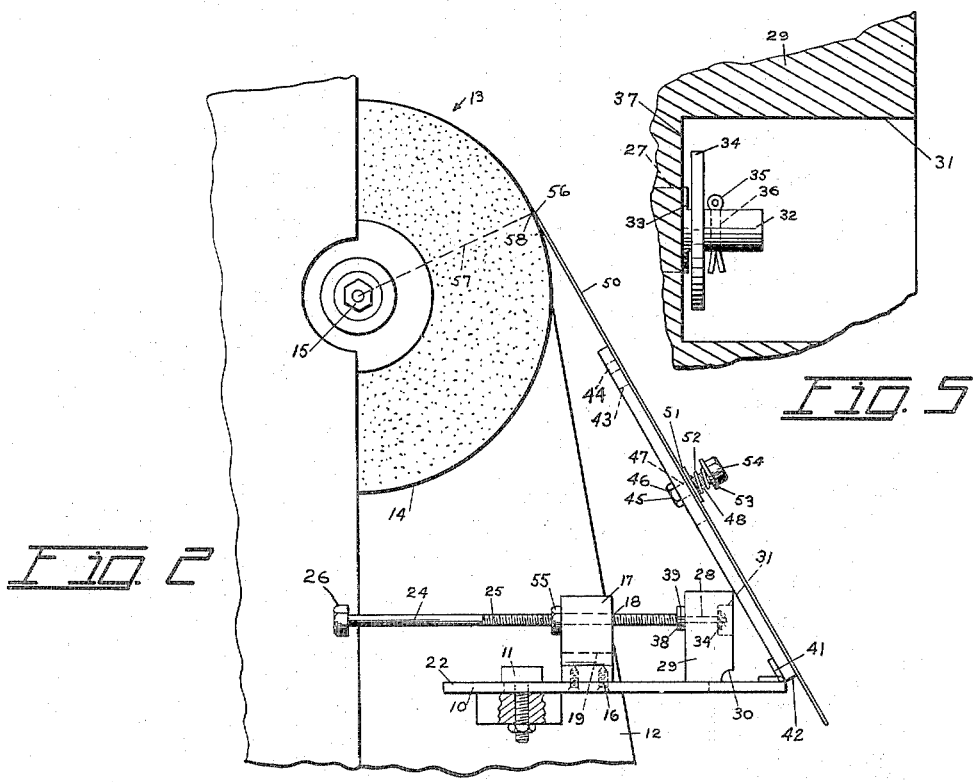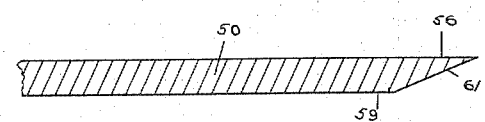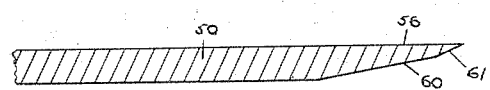

2,532,337

UNITED STATES PATENT OFFICE 2,532,337

FIXTURE FOR GRINDING CUTTERS

Ralph Sabatini, Rego Park, N. Y.

Application September 26, 1945, Serial No. 618,802

3 Claims. (Cl. 51—218)

(Granted under the act of March 3, 1883, as amended April 30, 1928; 370 O. G. 757)

This invention relates to fixtures for holding cutting tools in a grinder and, in particular, to fixtures for holding dado heads or the like, these being attachments to a woodworking machine such as a saw bench for cutting flat-bottomed grooves in woodwork.

One object of this invention is to provide a fixture for accurately holding dado heads, or similar cutting tools, at a predetermined angle relatively to the grinding wheel of a grinder.

Another object is to provide a fixture for grinding a predetermined clearance on the sides of dado heads or other cutting tools.

Another object is to provide a fixture for reclaiming or truing saws, dado heads, or similar cutting tools.

Another object is to provide a fixture for converting discarded circular saw blades into dado heads.

Another object is to provide a fixture for grinding alternate teeth on milling machine saws.

Further objects and advantages of this invention, as well as its construction, arrangement and operation, are apparent from the following description and claims in connection with the accompanying drawings, in which, Fig. 1 is a perspective view of a preferred embodiment of the fixture of this invention.

Fig. 2 is a side elevation of the fixture of Fig. 1, showing the fixture in use in a grinder.

Fig. 3 is an enlarged side elevation of a portion of a cutting tool before being ground by the use of the fixture of this invention.

Fig. 4 is a view similar to Figure 3 but showing the portion of the tool after grinding.

Fig. 5 is an enlarged detail view of a portion of Fig. 2.

Fig. 1 shows the fixture of this invention as consisting of a base 10 secured, as by one or more bolts 11 to the bed 12 of a conventional grinder, generally designated 13 (Fig. 2), having a grinding wheel 14 mounted on its shaft 15.

Secured to the base 10 by the machine screws 16 is a bracket 17 having a threaded bore 18. Below the bore 18 is a passageway 19 to permit the head of the bolt 11 to slide therethrough. The bracket 17 has leg portions 20 and 21 resting upon the upper surface 22 of the base 10 and straddling a slot 23 for the passage of the shank of the bolt 11.

Passing through the bore 18 of the bracket 17 is a screw 24 having a threaded portion 25 thereon engaging the threads in the threaded bore 18, and also having a head 26 for receiving a wrench or other suitable means for adjustably rotating the screw 24. The opposite end portion 27 of the screw 24 (Fig. 5) is unthreaded and of a reduced diameter, and passes through a bore 28 in a movable stop 29. Movable stop 29 is slidably mounted on the top surface 22 of the base 10. The stop 29 is provided with a cutaway portion 30 for serving as a clearance for a hinge member later to be described.

The stop 29 at the outer end of the bore 28 is provided with a countersunk portion 31 (Fig. 5) into which the outer end portion 27 of the screw 24 extends. The end portion 27 is provided with a reduced diameter portion 32 forming an annular shoulder 33 with the portion 27. The portion 32 carries a washer 34 retained by a cotter pin 35 in a hole 36 and engaging the bottom 37 of the countersink 31.

The end portion 27 of the screw 24 is separated from the threaded portion 25 by an annular shoulder 38 which serves as an abutment for a pair of washers 39. The latter serve as spacing members between the annular shoulder 38 and the surface 40 of the stop 29, permitting the end portion 27 to rotate freely within the bore 28 of the stop 29 while being secured firmly thereto.

Mounted upon the outer end of the base 10 is a hinge 41 secured to the lower end of a swinging arm 42 and serving as a pivotal connection therebetween. The arm 42 near its upper end is provided with an elongated slot 43 and a hole 44. Mounted in the slot 43 is a stud 45 having a nut 46 threaded upon the lower portion thereof and having a squared portion 47 fitting the slot 43 to keep the stud 45 from turning. The upper portion of the stud 45 is threaded as at 48 and separated from the squared portion 47 by an annular flange 49 engaging the arm 42. Mounted on the threaded portion 48 is the cutter or dado head 50 to be ground. The latter is urged against the shoulder 49 by a washer 51 and a compression spring 52 abutting a washer 53 held in position by a nut 54 on the threaded portion 48.

A lock nut 55 is mounted upon the threaded portion 25 of the screw shaft 24, thereby locking the stop 29 in its adjusted position.

In the operation of the invention, the rotary cutter 50 to be ground is secured to the arm 42 in the manner previously described and the nut 54 tightened until the cutter 50 is held firmly in position. The fixture is then placed upon the bed 12 of the grinder 13 and adjusted relatively thereto by the bolt 11 until the portion 56 of the cutter 50 is presented at the proper angle relatively to the grinding wheel 14.

The lock nut 55 is then loosened and a wrench applied to the head 26 to rotate the screw 24, thereby moving the stop 29 into a position to engage and halt the arm 42 when the grinding of the cutter 50 has reached the desired point. Thus the portion 56 of the cutter 50 is presented at the proper angle relatively to the radius 57 of the grinding wheel 14 to the point of contact 58 of the portion 56 before grinding. The portion 56 of the cutter 50 has the configuration shown approximately in Fig. 3.

The grinding wheel 14 is now placed in rotation by starting the usual motor (not shown) and the arm 42 is swung toward the stop 29 so that the area 59 of the portion 56 engages the grinding wheel 14. As the grinding proceeds, the portion 59 is ground away until it is transformed into the clearance 60. The cutter 50 is meanwhile rotated by hand until the clearance portion 60 becomes an annular zone. If the periphery 61 does not already possess the proper bevel, it is provided with such a bevel by grinding it in the same manner as is used in grinding the clearance portion 60. After the grinding has been completed, the periphery of the cutter 50 presents the appearance shown in Figure 4. The cutter 50 is then removed from the arm 42 by unscrewing the nut 54 and detaching the washer 53, the coil spring 52, and washer 51.

In this manner the fixture of this invention can be used to true the periphery of dado heads periodically, in order to keep them in proper condition. If the clearance 60 is not provided upon the dado head 50, the latter burns and is sometimes damaged beyond repair. By repeatedly grinding or filing away the periphery 61, the clearance 60 disappears, but it can be renewed by the use of this fixture. Furthermore, the dado head 50, if retrued periodically by the use of this fixture, can be used until its diameter is less than half of its original diameter. Previously such dado heads were ordinarily discarded after their original diameter had been reduced by about one sixth, hence the fixture of this invention enables dado heads to be used long after they formerly were discarded.

The fixture of the present invention can also be used to grind the alternate teeth on milling machine saws. It can also be used to convert discarded circular saws into dado heads, thereby reclaiming any circular saws which have otherwise outworn their usefulness. The entire operation requires only one half hour to one hour of a mechanic's time. The fixture is portable and is easily attached to or detached from the grinder 13.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A fixture for holding a piece of work in a machine having a tool for operating upon the work, said fixture comprising a base having an elongated slot formed therein and adapted to have a bolt extend therethrough to lock said base to the machine in selected position of adjustment; a holder having an elongated adjustment slot therein, said holder being hinged to said base and adapted to extend toward the tool; means for securing a piece of work relative to said holder including a bolt extending through the holder adjustment slot in selected position and adapted to have a piece of work mounted thereon adjacent said holder; and means for regulating the position of said holder relative to said base including a bracket mounted on said base, a shaft threaded through said bracket and extending towards said holder, a stop on said shaft adapted to move relative to said holder upon turning of said shaft, said holder being mounted for free swinging movement in one direction away from the stop and for swinging movement in the other direction into contact with said stop.

2. A fixture for holding a piece of work in a machine having a tool for operating upon the work, said fixture comprising a relatively long, narrow base having an elongated slot formed therein and adapted to have a bolt extend therethrough, said slot permitting adjustment of said base by translation or by rotation relative to the bolt, the bolt being adapted to lock said base to the machine in a selected position of adjustment; a relatively long, narrow holder having an elongated adjustment slot therein, said holder being hinged at one end to an end of said base and adapted to extend toward the tool; means for securing a piece of work relative to said holder including a bolt extending through the holder adjustment slot in selected position and adapted to have a piece of work mounted thereon adjacent said holder and a compression spring mounted on said bolt for resiliently clamping the piece of work relative to said holder; and means for regulating the position of said holder relative to said base including a bracket mounted on said base, a shaft threaded through said bracket and extending toward said holder, a stop on said shaft adapted to move relative to said holder upon turning of said shaft, said holder being mounted for the swinging movement in one direction away from the stop and for swinging movement in the other direction into contact with said stop.

3. A fixture for holding a piece of work in a machine having a tool for operating upon the work, said fixture comprising a relatively long, narrow base having an elongated slot formed therein and adapted to have a bolt extend therethrough, said slot permitting adjustment of said base by translation or by rotation relative to the bolt, the bolt being adapted to lock said base to the machine in a selected position of adjustment, said base being disposed in substantially horizontal position; a relatively long, narrow holder having an elongated adjustment slot therein, said holder being hinged at one end to an end of said base and extending substantially upwardly from said base and adapted to extend toward the tool; means for securing a piece of work on said holder including a bolt extending through the holder adjustment slot in selected position and adapted to have a piece of work mounted thereon adjacent said holder and a compression spring mounted on said bolt for resiliently clamping said piece of work relative to said holder; and means for regulating the position of said holder relative to said base including a bracket mounted on said base, a substantially horizontal shaft threaded through said bracket and extending toward said holder, a stop on said shaft adapted to move relative to said holder upon turning of said shaft, said holder being mounted for free swinging movement in one direction and for swinging movement in the other direction into contact with said stop, said holder being adapted to rest against said stop under the influence of gravity.

RALPH SABATINI.

REFERENCES CITED

The following references are of record in the file of this patent:

UNITED STATES PATENTS

| Number | Name | Date |
|---|---|---|
| 448,616 | Hudson | Mar. 17, 1891 |
| 1,135,245 | Zuleg | Apr. 13, 1915 |
| 1,853,245 | Wardwell | Apr. 12, 1932 |
| 2,294,836 | Deyarmond | Sept. 1, 1942 |
| 2,319,437 | Biasotti | May 18, 1943 |
| 2,347,087 | Deyarmond | Apr. 18, 1944 |

FOREIGN PATENTS

| Number | Country | Date |
|---|---|---|
| 200,636 | Great Britain | July 19, 1923 |